United States Patent
Sato

(10) Patent No.: US 10,042,493 B2
(45) Date of Patent: Aug. 7, 2018

(54) TOUCH PANEL HAVING INCONSPICUOUS ELECTRODES

(71) Applicant: JAPAN AVIATION ELECTRONICS INDUSTRY, LIMITED, Tokyo (JP)

(72) Inventor: Mitsunori Sato, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 182 days.

(21) Appl. No.: 15/127,929

(22) PCT Filed: Jun. 23, 2015

(86) PCT No.: PCT/JP2015/068004
§ 371 (c)(1),
(2) Date: Sep. 21, 2016

(87) PCT Pub. No.: WO2016/002583
PCT Pub. Date: Jan. 7, 2016

(65) Prior Publication Data
US 2017/0108964 A1     Apr. 20, 2017

(30) Foreign Application Priority Data

Jul. 2, 2014 (JP) ................. 2014-136645

(51) Int. Cl.
*G06F 3/045* (2006.01)
*G06F 3/044* (2006.01)

(52) U.S. Cl.
CPC .... *G06F 3/044* (2013.01); *G06F 2203/04111* (2013.01); *G06F 2203/04112* (2013.01)

(58) Field of Classification Search
CPC ...... G06F 3/044; G06F 3/0414; G06F 3/0416; G06F 2203/04111; G06F 2203/04112
See application file for complete search history.

(56) References Cited

U.S. PATENT DOCUMENTS 8,400,418 B2   3/2013 Matsuo
9,904,088 B2 * 2/2018 Chai .................. G02F 1/13338
(Continued)

FOREIGN PATENT DOCUMENTS

JP    2010-002958       1/2010
JP    2010-231533 A    10/2010
(Continued)

OTHER PUBLICATIONS

International Search Report (ISR) issued for International Patent Application No. PCT/JP2015/068004, dated Sep. 8, 2015.

*Primary Examiner* — Vijay Shankar
(74) *Attorney, Agent, or Firm* — Greenblum & Bernstein, P.L.C.

(57) ABSTRACT

The touch panel of the present invention includes a transparent substrate, a plurality of X-direction electrodes, a plurality of Y-direction electrodes, X-direction connecting parts, Y-direction connecting parts, one or more insulation films, X-direction mesh electrodes, and Y-direction mesh electrodes. When there is a part where the one or more insulation films are not formed in the areas where the X-direction connecting parts are formed, at least an X-direction connecting mesh electrode is provided as well. The X-direction electrodes, the Y-direction electrodes, and the X-direction connecting parts are films of a transparent electrically conductive material formed in the same layer. The Y-direction connecting parts are formed like a mesh by an electrically conductive material so as to become a part of a mesh pattern. The X-direction mesh electrodes, the Y-direction mesh electrodes, and the X-direction connecting mesh electrodes are formed by the electrically conductive material.

14 Claims, 14 Drawing Sheets

(56) References Cited

U.S. PATENT DOCUMENTS

| | | | |
|---|---|---|---|
| 2009/0244028 A1* | 10/2009 | Matsuo | G06F 3/044 345/174 |
| 2009/0315854 A1 | 12/2009 | Matsuo | |
| 2010/0309164 A1* | 12/2010 | Yeh | G06F 3/044 345/174 |
| 2011/0310033 A1* | 12/2011 | Liu | G06F 3/0412 345/173 |
| 2012/0132511 A1* | 5/2012 | Tanaka | G06F 3/044 200/600 |
| 2014/0022467 A1 | 1/2014 | Chai et al. | |
| 2015/0145813 A1 | 5/2015 | Takiguchi et al. | |

FOREIGN PATENT DOCUMENTS

| JP | 2013-246723 | 12/2013 |
|---|---|---|
| WO | 2012/099394 A2 | 7/2012 |
| WO | 2013/073299 A1 | 5/2013 |

\* cited by examiner

PRIOR ART

TOUCH PANEL HAVING INCONSPICUOUS ELECTRODES

TECHNICAL FIELD

The present invention relates to capacitive touch panels.

BACKGROUND ART

Known capacitive touch panels include those disclosed in patent literature 1 to 3. The terms used in patent literature 1 to 3 vary. However, all those touch panels include a transparent substrate, a plurality of X-direction electrodes arranged along a plurality of lines in the X direction, which is a predetermined direction parallel to the surface of the substrate, a plurality of Y-direction electrodes arranged along a plurality of lines in the Y direction, which is the direction parallel to the surface of the substrate and perpendicular to the X direction, X-direction connecting parts that electrically connect the X-direction electrodes adjoining in the X direction with each other, Y-direction connecting parts that electrically connect the Y-direction electrodes adjoining in the Y direction with each other, and insulation films formed between the X-direction connecting parts and the Y-direction connecting parts.

PRIOR ART LITERATURE

Patent Literature

Patent literature 1: Japanese Patent Application Laid Open No. 2010-2958
Patent literature 2: International Publication WO2012/099394
Patent literature 3: Japanese Patent Application Laid Open No. 2013-246723

SUMMARY OF THE INVENTION

Problems to be Solved by the Invention

All of the patent literature given above explain that the electrodes are inconspicuous in the configurations described in the specifications. However, the conventional techniques have such a problem that the appearances around intersection areas of the X-direction connecting parts and the Y-direction connecting parts subtly differ from those of the other areas and can be recognized with the naked eye in a detailed evaluation. FIG. 1 is a view for illustrating the problem of a touch panel in patent literature 1. FIG. 1 in patent literature 2 is shown here as FIG. 2, and FIG. 1 in patent literature 3 is shown here as FIG. 3.

The touch panel in patent literature 1 uses a transparent electrically conductive material for all of the X-direction electrodes, the Y-direction electrodes, the X-direction connecting parts, and the Y-direction connecting parts (the pads 11a, the pads 12a, the connecting parts 11c, and the junction electrodes 5a in patent literature 1). Since the transparent electrically conductive material is not colorless, the parts 5d (shaded in FIG. 1) where the Y-direction connecting part 5a overlaps the Y-direction electrodes 12a or the X-direction connecting part 11c has a deeper color and can be recognized with the naked eye.

The touch panel in patent literature 2 uses a transparent electrically conductive material for the X-direction electrodes, the X-direction connecting parts, and the Y-direction electrodes (the first sensor parts 22a, the first electrode connection parts 22b, and the second sensor parts 24a in patent literature 2), and the Y-direction connecting parts (the second electrode connection parts 24b in patent literature 2) are formed like a mesh. However, the areas where the mesh-like Y-direction connecting parts are disposed can be recognized with the naked eye.

In the touch panel in patent literature 3, the X-direction electrodes, the X-direction connecting parts, and the Y-direction electrodes (the line electrodes 12, the connecting parts 122, and the line electrodes 13 in patent literature 3) are formed like meshes, and the Y-direction connecting parts (the bridge parts 41 in patent literature 3) use a transparent electrically conductive material. However, since the transparent electrically conductive material is not colorless, the difference caused by the presence or absence of the transparent electrically conductive material can be recognized with the naked eye.

As described above, something can be recognized with the naked eye in a detailed evaluation. Therefore, an object of the present invention is to make the electrodes less conspicuous than those in the conventional techniques.

Means to Solve the Problems

A touch panel according to the present invention includes a transparent substrate; a plurality of X-direction electrodes arranged along a plurality of lines in an X direction, which is a predetermined direction parallel to a surface of the substrate; a plurality of Y-direction electrodes arranged along a plurality of lines in a Y direction, which is a direction parallel to the surface of the substrate and perpendicular to the X direction; X-direction connecting parts that electrically connect X-direction electrodes adjoining in the X direction with each other; Y-direction connecting parts that electrically connect Y-direction electrodes adjoining in the Y direction with each other; one or more insulation films that are formed between the X-direction connecting parts and the Y-direction connecting parts; X-direction mesh electrodes; and Y-direction mesh electrodes. The X-direction electrodes, the Y-direction electrodes, and the X-direction connecting parts are films of a transparent electrically conductive material formed in the same layer. The Y-direction connecting parts are formed like a mesh by an electrically conductive material so as to become a part of a predetermined mesh pattern. The X-direction mesh electrodes are formed like a mesh by the electrically conductive material so as to become a part of the mesh pattern in areas where the X-direction electrodes are formed, and are insulated from the Y-direction connecting parts. The Y-direction mesh electrodes are formed like a mesh by the electrically conductive material so as to become a part of the mesh pattern in areas where the Y-direction electrodes are formed, and are insulated from the X-direction mesh electrodes. When there is a part where the one or more insulation films are not formed in the areas where the X-direction connecting parts are formed, X-direction connecting mesh electrodes are formed further like a mesh by the electrically conductive material so as to become a part of the mesh pattern and are insulated from the Y-direction connecting parts and the Y-direction mesh electrodes, at least in the part where the one or more insulation films are not formed in the areas where the X-direction connecting parts are formed.

Effects of the Invention

According to the touch panel of the present invention, since the films of transparent electrically conductive material do not overlap, any difference in color that would be caused by a difference in thickness of the transparent electrically conductive material will not occur. Because both the transparent electrically conductive material and the mesh pattern formed by using an electrically conductive material are disposed almost over the whole area, conspicuousness will not be affected by the difference between the areas where the transparent electrically conductive material and the mesh pattern are present and the areas where they are absent. Therefore, the electrodes in the touch panel of the present invention are less conspicuous than those in the conventional touch panels.

DETAILED DESCRIPTION OF THE EMBODIMENTS

Figure 1:
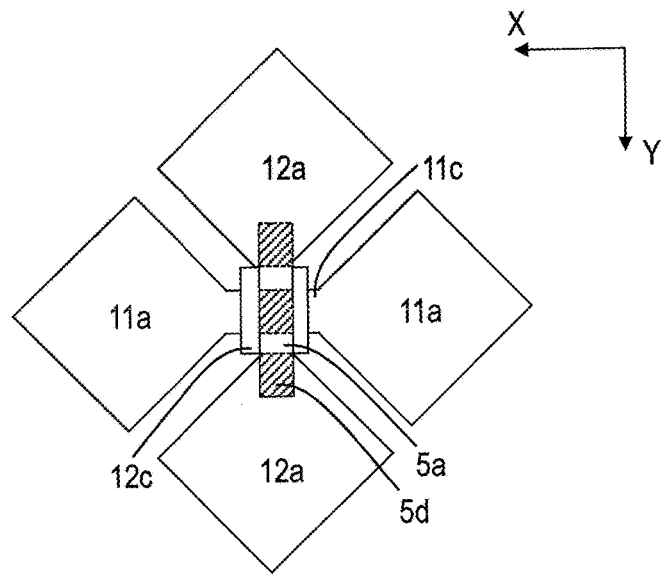
FIG. 1 is a view for explaining a problem with a touch panel in patent literature 1.
Figure 2:
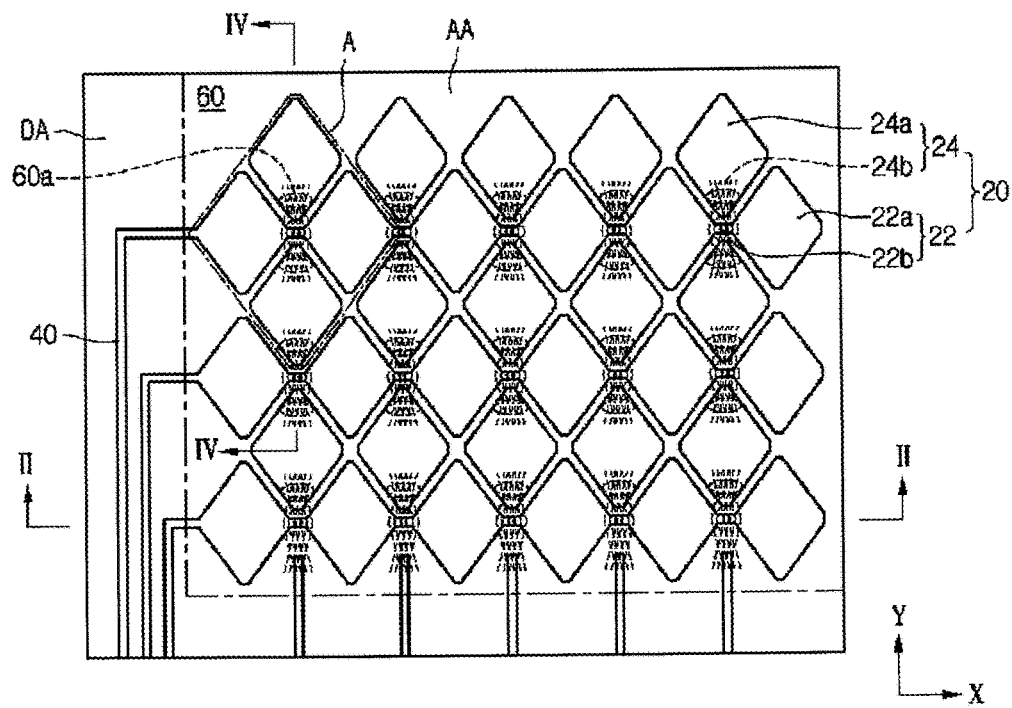
FIG. 2 is a view showing FIG. 1 in patent literature 2.
Figure 3:
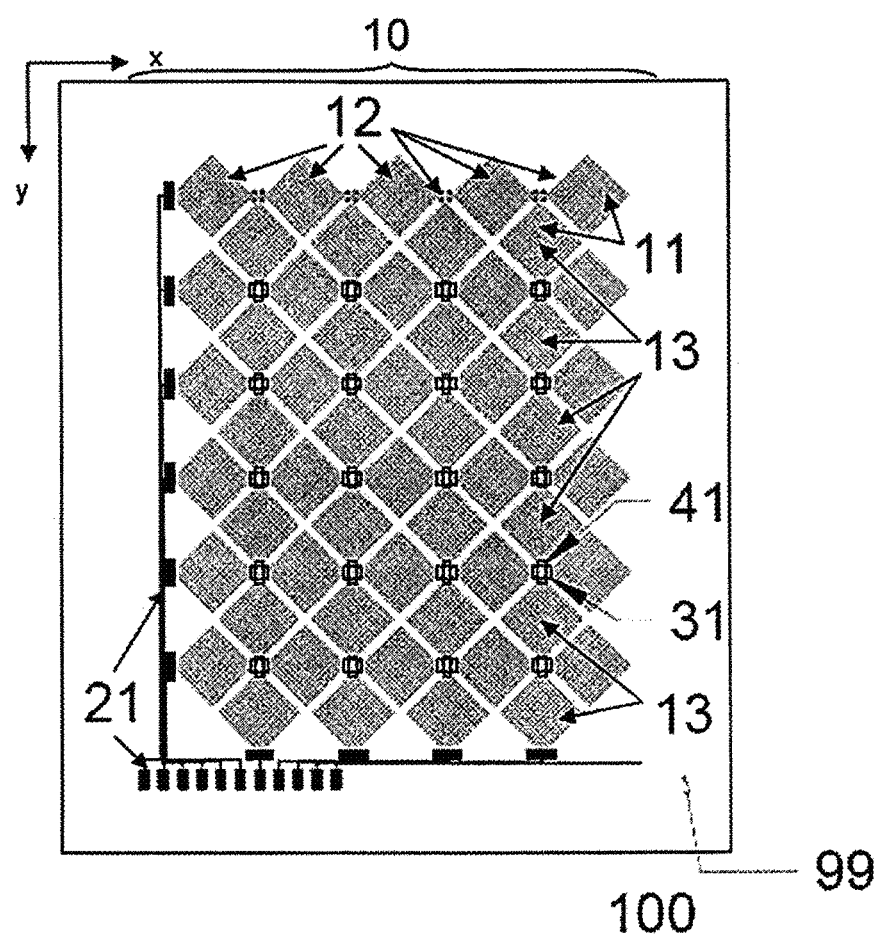
FIG. 3 is a view showing FIG. 1 in patent literature 3.

Now, embodiments of the present invention will be described in detail. Components having the same function will be denoted by the same reference numeral, and redundant description will be avoided.

First Embodiment

Figure 4:
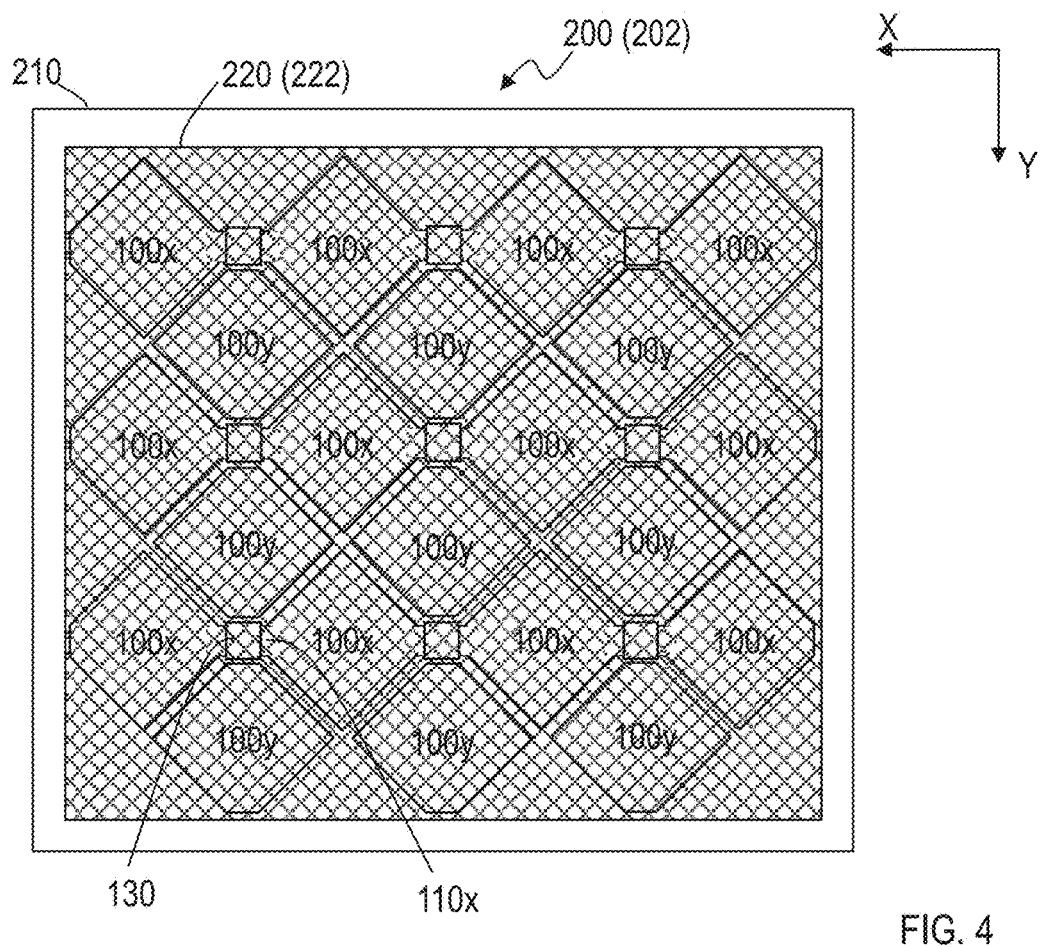
FIG. 4 is a plan view (view seen from the normal direction of the substrate) of a touch panel in a first embodiment and a second embodiment.

FIG. 4 shows a plan view (view seen from the normal direction of the substrate 210) of a touch panel 200 according to a first embodiment. The touch panel 200 includes a transparent substrate 210, a plurality of X-direction electrodes 100x arranged along a plurality of lines in the X direction, which is a predetermined direction parallel to the surface of the substrate 210, a plurality of Y-direction electrodes 100y arranged along a plurality of lines in the Y direction, which is the direction parallel to the surface of the substrate and perpendicular to the X direction, X-direction connecting parts 110x which electrically connect the X-direction electrodes adjoining in the X direction with each other, insulation films 130, and a mesh pattern 220. The substrate 210 is transparent, and a layer of polyethylene terephthalate (PET), polycarbonate, or cycloolefin polymer (COP) having a thickness of around 100 for example, can be used. The front panel to be touched by the user can also be used as the substrate. If a substrate other than the front panel is used, the substrate should be bonded to the front panel after the touch panel is formed; if the front panel is used as the substrate, the touch panel should be formed directly on the surface of the front panel not to be touched by the user.

Figure 5:
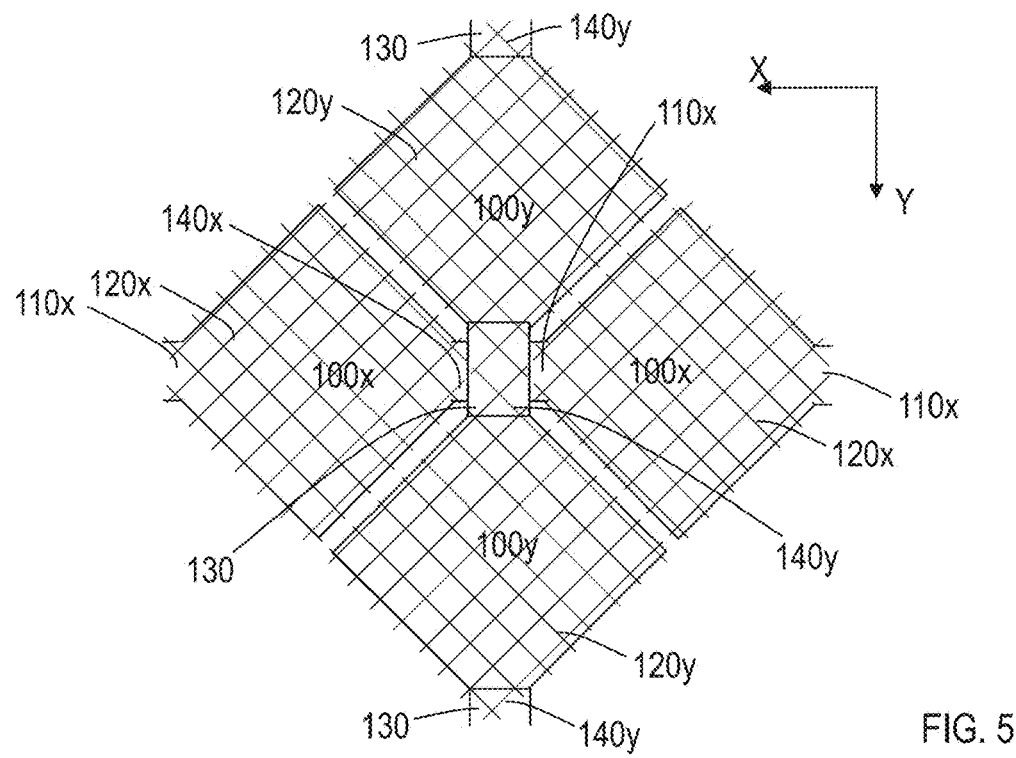
FIG. 5 is an enlarged plan view of a region including two X-direction electrodes 100x and two Y-direction electrodes 100y in FIG. 4.
Figure 6:
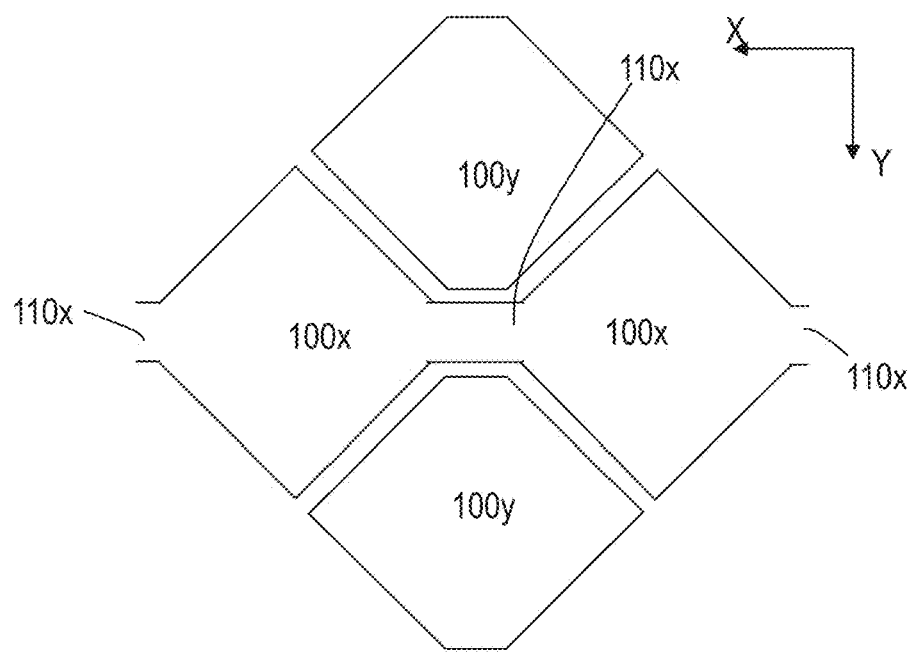
FIG. 6 is a view showing just the X-direction electrodes 100x, the Y-direction electrodes 100y, and X-direction connecting parts 110x in FIG. 5.
Figure 7:
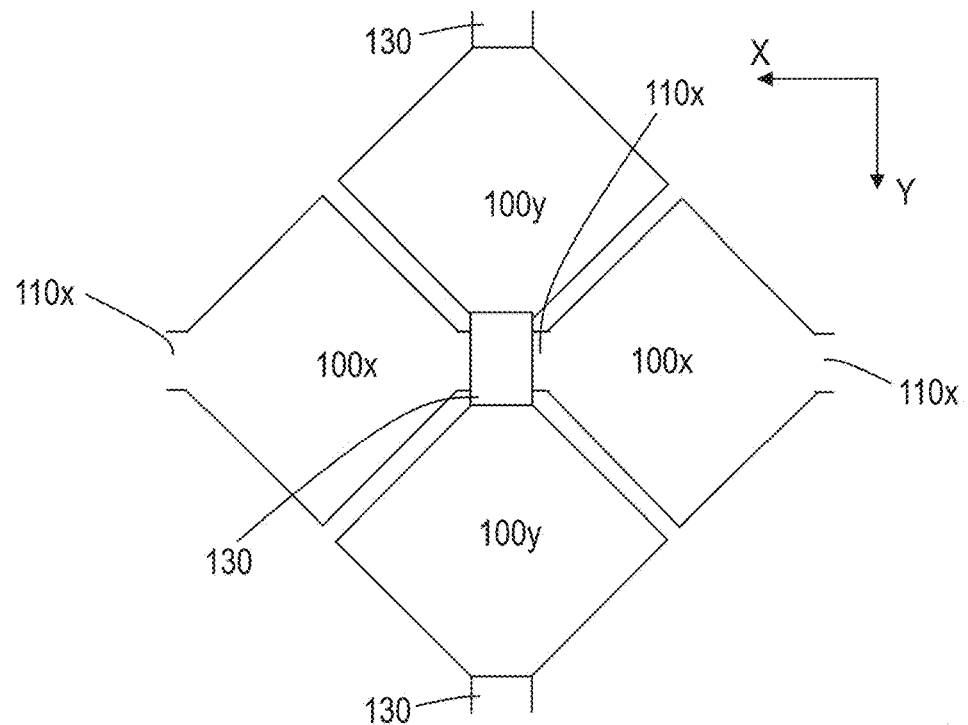
FIG. 7 is a plan view showing a state in which insulation films 130 are formed in addition to the state in FIG. 6.
Figure 8:
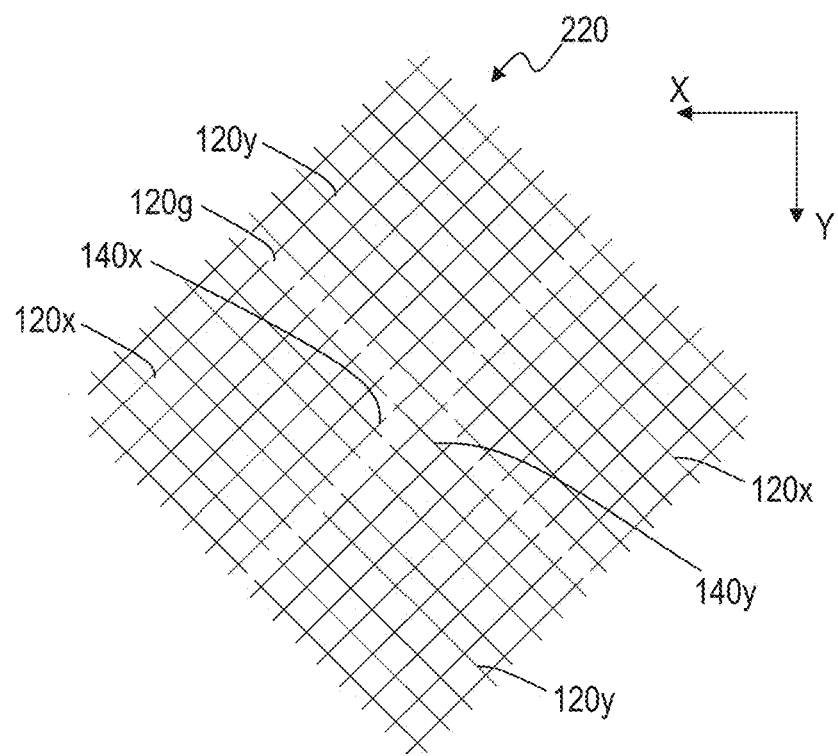
FIG. 8 is a view showing an example of a mesh pattern 220 in the region shown in FIG. 5.

FIG. 5 is an enlarged plan view of a region including two X-direction electrodes 100x and two Y-direction electrodes 100y in FIG. 4. FIG. 6 is a view showing just the X-direction electrodes 100x, the Y-direction electrodes 100y, and the X-direction connecting parts 110x in FIG. 5; FIG. 7 is a plan view showing a state in which insulation films 130 are formed in addition to the state in FIG. 6; and FIG. 8 is a view showing an example of a mesh pattern 220 in the region shown in FIG. 5. The X-direction electrodes 100x, the Y-direction electrodes 100y, and the X-direction connecting parts 110x are films of a transparent electrically conductive material formed in the same layer. As the transparent electrically conductive material, poly(3,4-ethylenedioxythiophene) (PEDOT) can be used, or indium tin oxide (ITO) can be used. As the insulation films 130, acrylic or polyester could be used, and the thickness should be around 1 to 2 μm. When poly(3,4-ethylenedioxythiophene) (PEDOT) is used, the X-direction electrodes 100x, the Y-direction electrodes 100y, and the X-direction connecting parts 110x can be formed by printing. When indium tin oxide (ITO) is used, after an ITO film is deposited on the substrate 210 by sputtering, the X-direction electrodes 100x, the Y-direction electrodes 100y, and the X-direction connecting parts 110x should be formed by patterning through chemical etching. When the X-direction electrodes 100x, the Y-direction electrodes 100y, and the X-direction connecting parts 110x are formed at intervals from 1 µm to 50 µm, both inclusive, their conspicuousness can be lowered. The thickness should be around 400 nm.

The mesh pattern 220 is formed of an electrically conductive material and has a plurality of breaks 120g for insulation. As the electrically conductive material, thin metal lines of silver, copper, or the like are used. In FIGS. 5 and 8, the thin lines of electrically conductive material are represented by solid lines, and since the other areas do not use the electrically conductive material, the transparent state can be maintained on the whole. To lower the conspicuousness of the electrically conductive material, the width should be 7 µm or less, the repeating cycle of the mesh pattern 220 should be 200 to 400 µm, and the length of each break 120g should be from 1 µm to 20 µm, both inclusive. To enhance the reliability against corrosion, the width should be 3 µm or larger, and the thickness should be 1 to 2 µm. Depending on the place, the mesh pattern 220 is separated into the Y-direction connecting parts 140y, the X-direction mesh electrodes 120x, the Y-direction mesh electrodes 120y, and the X-direction connecting mesh electrodes 140x.

The Y-direction connecting parts 140y are formed like a mesh by the electrically conductive material so as to become a part of the mesh pattern 220, and electrically connect the Y-direction electrodes 100y adjoining in the Y direction with each other. Each piece of the Y-direction connecting parts 140y electrically connects Y-direction electrodes 100y adjoining with each other in two or more paths formed by the electrically conductive material. For example, since the Y-direction connecting parts 140y in FIG. 5 are formed by a series of square patterns, even if a break occurs due to corrosion or the like, somewhere excluding points of intersection, the Y-direction electrodes 100y can be maintained in the electrically connected state, and consequently the durability and reliability can be enhanced.

The X-direction mesh electrodes 120x are formed like a mesh by the electrically conductive material so as to become a part of the mesh pattern 220 in the areas where the X-direction electrodes 100x are formed and are insulated from the Y-direction connecting parts 140y. The areas here mean the regions shown in a plan view (view seen from the normal direction of the substrate 210). This meaning applies to the subsequent description as well. The Y-direction mesh electrodes 120y are formed like a mesh by the electrically conductive material so as to become a part of the mesh pattern 220 in the areas where the Y-direction electrodes 100y are formed and are insulated from the X-direction mesh electrodes 120x.

If there is a part where no insulation film 130 is formed within the areas where the X-direction connecting parts 110x are formed, the X-direction connecting mesh electrodes 140x are formed like a mesh by the electrically conductive material so as to become a part of the mesh pattern 220, at least in the part where no insulation film 130 is formed within the areas where the X-direction connecting parts 110x are formed. The X-direction connecting mesh electrodes 140x are insulated from the Y-direction connecting parts 140y and the Y-direction mesh electrodes 120y. The X-direction connecting mesh electrodes 140x may be formed (on the X-direction connecting parts 110x) on the sides of the insulation films 130 on which the Y-direction connecting parts 140y are not formed, even when the insulation films 130 are formed over the areas where the X-direction connecting parts 110x are formed.

When the X-direction mesh electrodes 120x, the Y-direction mesh electrodes 120y, and the X-direction connecting mesh electrodes 140x are prevented from being formed on the sides of the insulation films 130 on which the Y-direction connecting parts 140y are not formed, the Y-direction connecting parts 140y, the X-direction mesh electrodes 120x, the Y-direction mesh electrodes 120y, and the X-direction connecting mesh electrodes 140x can be formed by a single process (printing). Therefore, the touch panel 200 can be fabricated by three processes: a transparent electrically conductive material process of forming films of transparent electrically conductive material (the X-direction electrodes 100x, the Y-direction electrodes 100y, and the X-direction connecting parts 110x), an insulation film process of forming the insulation films 130, and a mesh pattern process of forming the mesh pattern 220. The touch panel 200 can also be fabricated by performing the mesh pattern process, the insulation film process, and the transparent electrically conductive material process in that order.

Figure 9A:
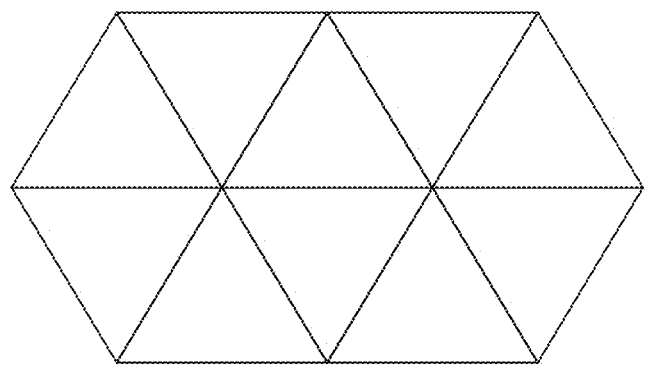
FIG. 9A is a view showing a first example of the mesh pattern.
Figure 9B:
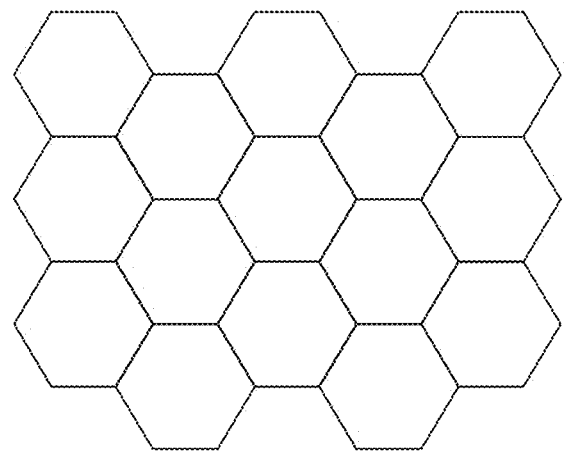
FIG. 9B is a view showing a second example of the mesh pattern.
Figure 9C:
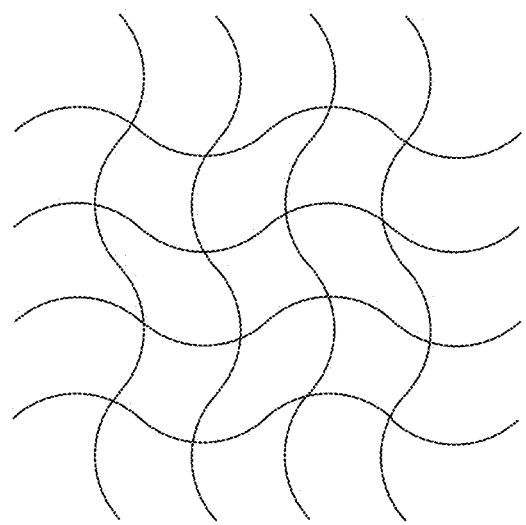
FIG. 9C is a view showing a third example of the mesh pattern.

FIG. 9A, FIG. 9B, and FIG. 9C are views showing examples of the mesh pattern. FIGS. 5 and 8 show square mesh patterns, but the mesh pattern can be triangular, as shown in FIG. 9A, hexagonal, as shown in FIG. 9B, and wavy, as shown in FIG. 9C or can have a different shape (such as octagonal) that is not shown in the drawings. Although square mesh patterns are shown in the drawings in the subsequent description of modifications and a second embodiment, a different pattern can be used, as described in this embodiment.

According to the touch panel 200, since the films of transparent electrically conductive material do not overlap, any difference in color that would be caused by a difference in thickness of the transparent electrically conductive material will not occur. In addition, because both the transparent electrically conductive material and the mesh pattern formed by using the electrically conductive material are disposed almost over the entire area, any difference between the areas where the transparent electrically conductive material and the mesh pattern are present and the areas where they are absent will not affect the conspicuousness. Therefore, the electrodes in the touch panel 200 are less conspicuous than those in the conventional touch panels.

The Y-direction connecting parts 140y of the touch panel 200 are so thin that the opposing areas of the X-direction connecting parts 110x and the Y-direction connecting parts 140y are very small in comparison with the opposing areas of the X-direction connecting parts 11c and the Y-direction connecting parts 5a in patent literature 1. In other words, stray capacitance occurring between the X-direction connecting parts 110x and the Y-direction connecting parts 140y can be reduced. Accordingly, the sensitivity of the touch panel can be improved. Since the mesh pattern 220 of the electrically conductive material is formed on the films of the transparent electrically conductive material, the resistance of the electrodes can be lowered.

Modification

Figure 10:
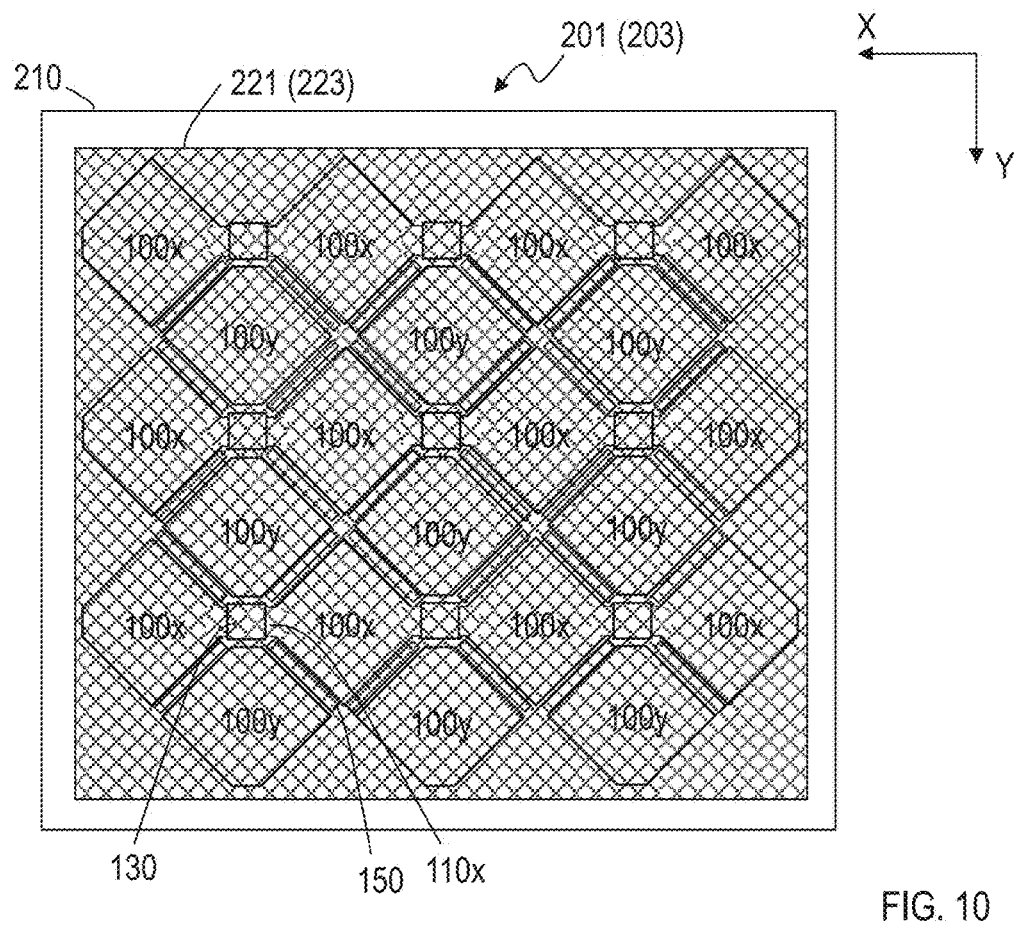
FIG. 10 is a plan view (view seen from the normal direction of the substrate) of a touch panel in a modification of the first embodiment and a modification of the second embodiment.

FIG. 10 shows a plan view (view seen from the normal direction of the substrate 210) of a touch panel 201 according to a modification. The touch panel 201 differs from the touch panel 200 in that: dummy electrodes 150 that are films of a transparent electrically conductive material are provided between the X-direction electrodes 100x and the Y-direction electrodes 100y; and dummy mesh electrodes 160 are also provided in the areas where the dummy electrodes are formed. Otherwise, the modification is the same as the first embodiment.

Figure 11:
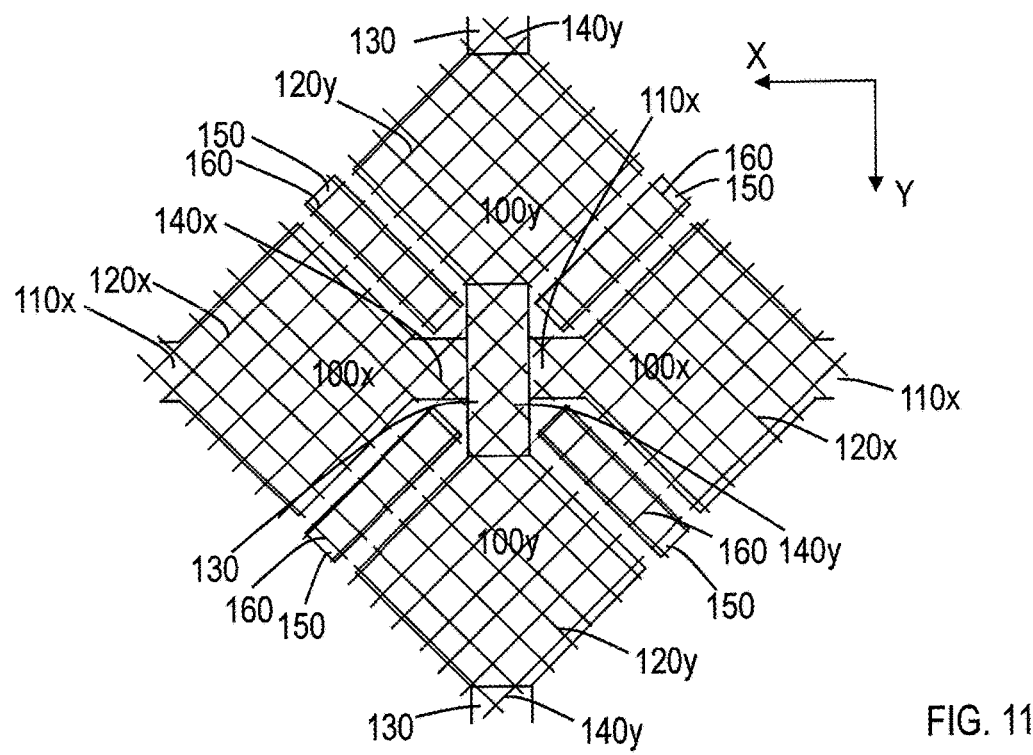
FIG. 11 is an enlarged plan view of a region including two X-direction electrodes 100x and two Y-direction electrodes 100y when dummy electrodes 150 are also provided.
Figure 12:
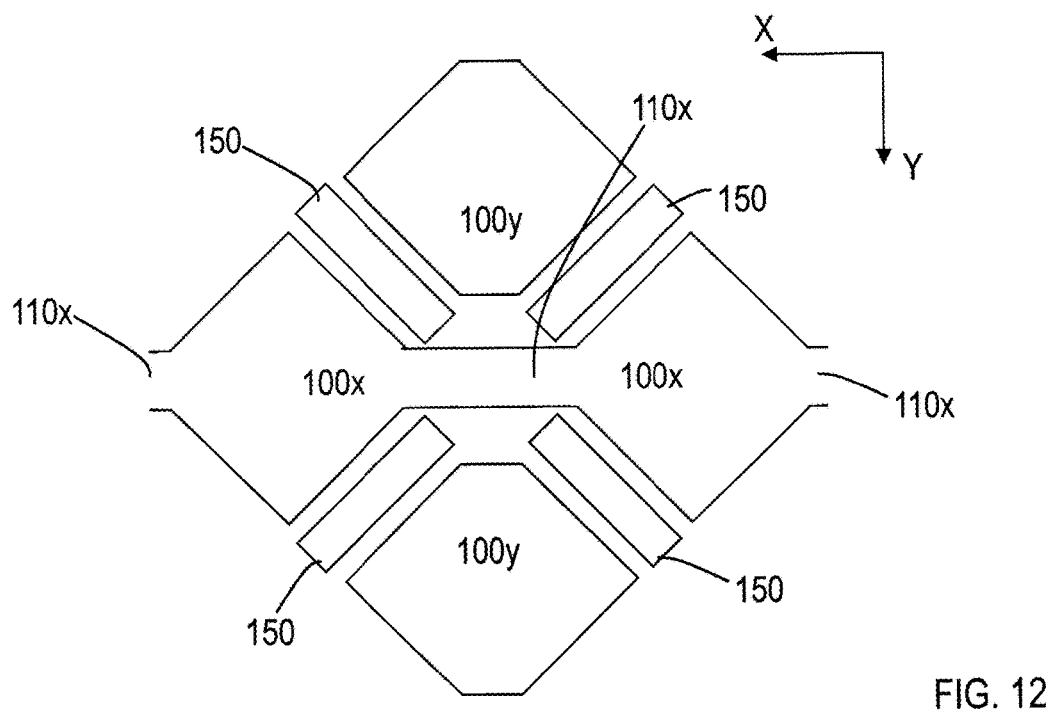
FIG. 12 is a view showing the X-direction electrodes 100x, the Y-direction electrodes 100y, X-direction connecting parts 110x, and the dummy electrodes 150 in FIG. 11.
Figure 13:
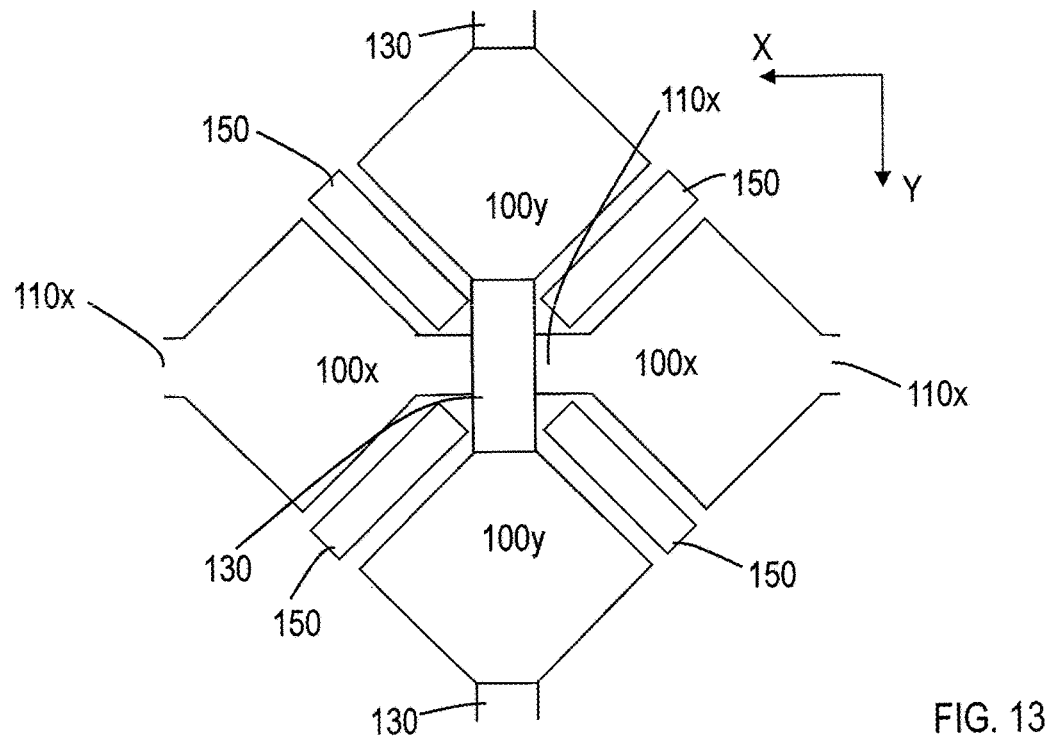
FIG. 13 is a plan view showing a state in which insulation films 130 are formed in addition to the state in FIG. 12.
Figure 14:
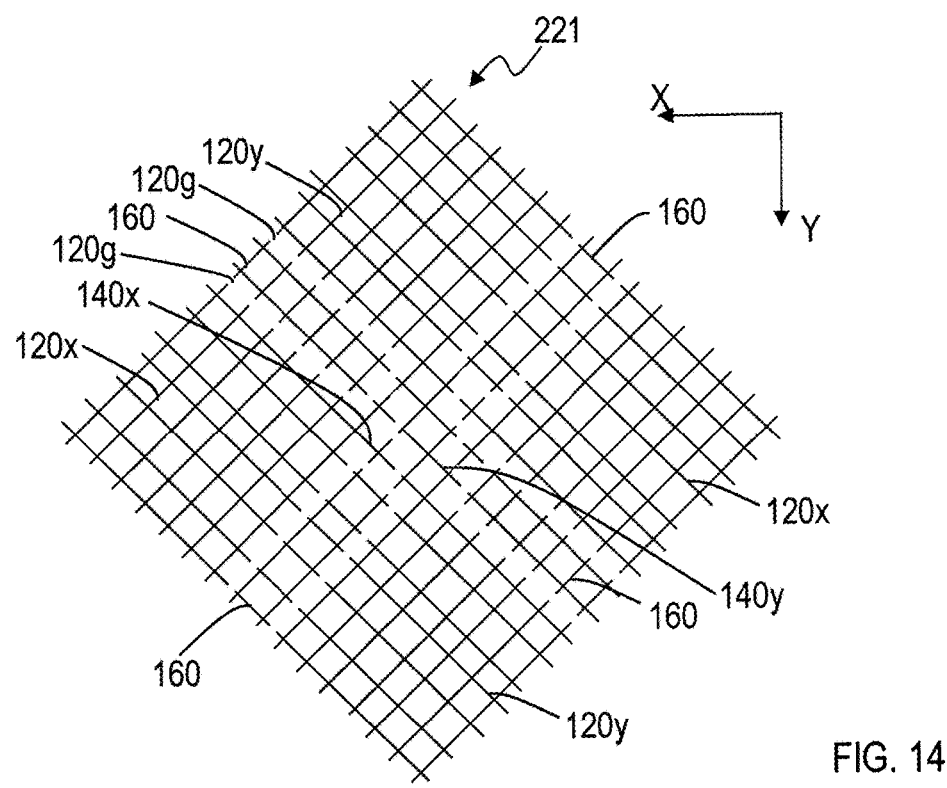
FIG. 14 is a view showing an example of a mesh pattern 221 in the region shown in FIG. 11.

FIG. 11 shows an enlarged plan view of a region including two X-direction electrodes 100x and two Y-direction electrodes 100y when dummy electrodes 150 are also provided. FIG. 12 is a view showing the X-direction electrodes 100x, the Y-direction electrodes 100y, X-direction connecting parts 110x, and the dummy electrodes 150 in FIG. 11; FIG. 13 is a plan view showing a state in which insulation films 130 are also formed in addition to the state in FIG. 12; FIG. 14 is a view showing an example of a mesh pattern 221 in the region shown in FIG. 11.

In the touch panel 201, the dummy electrodes 150 are formed in the same layer in which the X-direction electrodes 100x, the Y-direction electrodes 100y, and the X-direction connecting parts 110x are provided (see FIG. 12). The touch panel 201 further includes dummy mesh electrodes 160 in the areas where the dummy electrodes 150 are formed. The dummy mesh electrodes 160 are formed like a mesh by an electrically conductive material so as to become parts of the mesh pattern 221 and are insulated from the X-direction mesh electrodes 120x and the Y-direction mesh electrodes 120y. Since the dummy mesh electrodes 160 are included, the positions of breaks 120g in the mesh pattern 221 differ from those in the mesh pattern 220.

The conditions for lowering the conspicuousness of the mesh pattern and the films of the transparent electrically conductive material are the same as those in the first embodiment. That is, the width of the electrically conductive material forming the mesh pattern 221 should be 7 µm or less; the repeating cycle of the mesh pattern 221 should be 200 to 400 µm, the length of each break for insulating the mesh pattern should be from 1 µm to 20 µm, both inclusive, and the spacing for insulating the films of transparent electrically conductive material from each other should be from 1 µm to 50 µm, both inclusive. To enhance the reliability against corrosion, the width of the electrically conductive material should be 3 µm or larger.

Since the configuration is as described above, the touch panel 201 can also provide the same advantageous effect as the touch panel 200 in the first embodiment.

Second Embodiment

Described in the first embodiment is the touch panel that can be fabricated through the three processes, which are the transparent electrically conductive material process, the insulation film process, and the mesh pattern process. In a second embodiment, a touch panel that can be fabricated through four processes, which are a transparent electrically conductive material process, a first mesh pattern process, an insulation film process, and a second mesh pattern process, will be described. A plan view (a view seen from the normal direction of the substrate 210) of a touch panel 202 in the second embodiment is the same as that in FIG. 4. A enlarged plan view of a region including two X-direction electrodes 100x and two Y-direction electrodes 100y is the same as that in FIG. 5, and the shapes of the X-direction electrodes 100x, the Y-direction electrodes 100y, and X-direction connecting parts 110x formed in the transparent electrically conductive material process are the same as those in FIG. 6. The materials, dimensions, and the like of the substrate 210 and a mesh pattern 222 are the same as those in the first embodiment. Points of difference will be described below.

Figure 15:
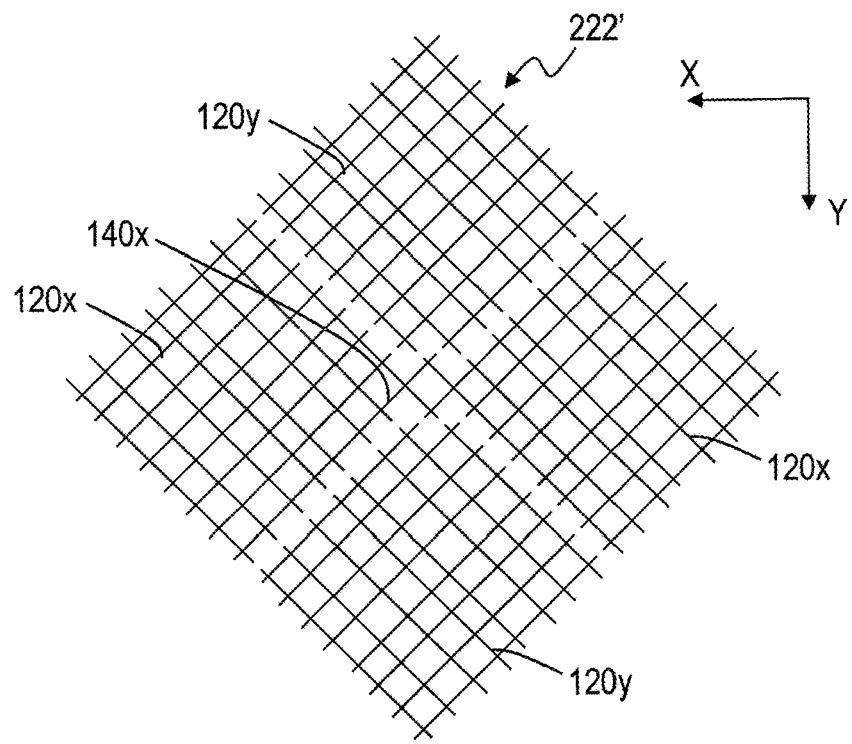
FIG. 15 is a view showing a mesh pattern 222' formed in a first mesh pattern process.

FIG. 15 is a view showing a mesh pattern 222' formed in the first mesh pattern process. The mesh pattern 222' in FIG. 15 differs from the mesh pattern 220 in the first embodiment in that the Y-direction connecting parts 140y are not present. In the example shown in FIG. 15, an X-direction connecting mesh electrode 140x connects adjacent X-direction mesh electrodes 120x and does not need to be present in a position where a Y-direction connecting part 140y would be formed.

Figure 16:
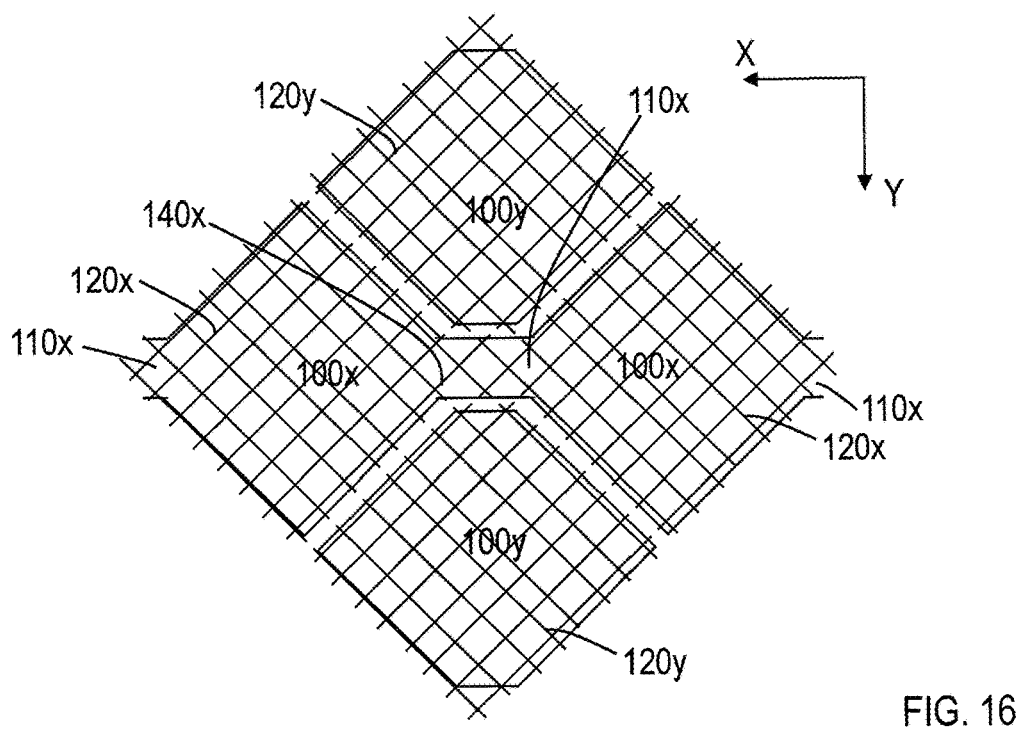
FIG. 16 is a view showing the mesh pattern 222' formed (printed) on the films of electrically conductive material (the X-direction electrodes 100x, the Y-direction electrodes 100y, and the X-direction connecting parts 110x) shown in FIG. 6.

FIG. 16 shows a state in which the mesh pattern 222' is formed (printed) on the films of the electrically conductive material (the X-direction electrodes 100x, the Y-direction electrodes 100y, and the X-direction connecting parts 110x) shown in FIG. 6. The process of forming the mesh pattern 222' in FIG. 15 is the first mesh pattern process.

The conditions for lowering the conspicuousness of the mesh pattern and the films of the transparent electrically conductive material are the same as those in the first embodiment. That is, the width of the electrically conductive material forming the mesh pattern 222' should be 7 µm or less; the repeating cycle of the mesh pattern 222' should be 200 to 400 µm; the length of each break for insulating the mesh pattern should be from 1 µm to 20 µm, both inclusive; and the spacing for insulating the films of transparent electrically conductive material from each other should be 50 µm or less. To enhance the reliability against corrosion, the width of the electrically conductive material should be 3 µm or greater.

Figure 17:
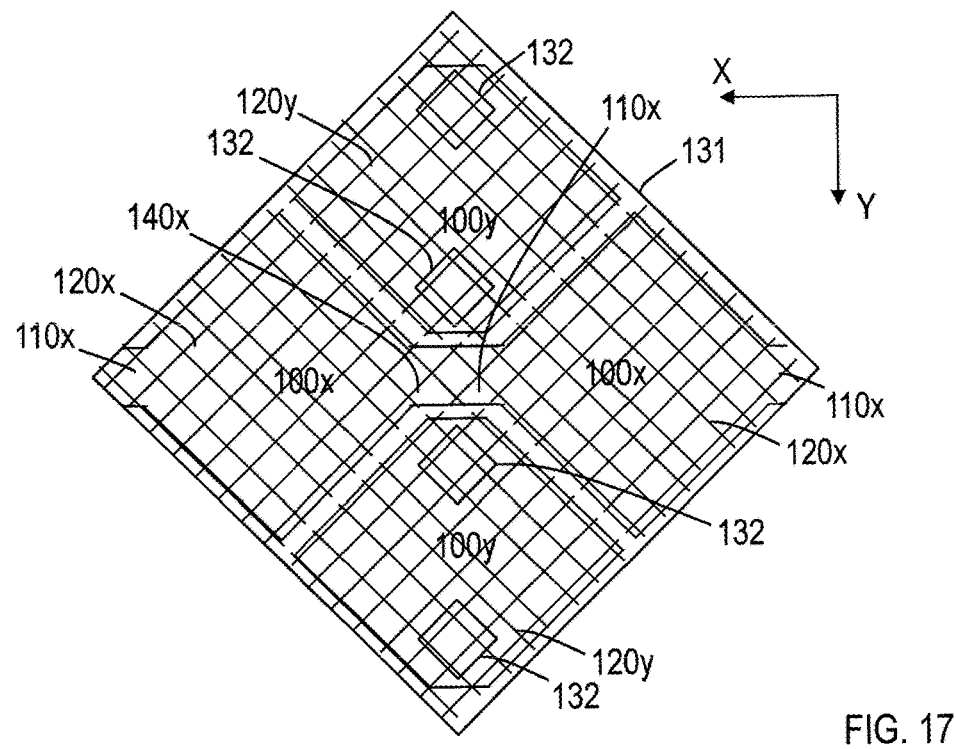
FIG. 17 is a plan view showing a state in which an insulation film 131 is formed in addition to the state in FIG. 16.

Then, an insulation film 131 is formed (insulation film process). FIG. 17 is a plan view showing a state in which the insulation film 131 is formed in addition to the state in FIG. 16. The insulation film 131 has through holes 132 in one or more parts of the area in which each of the Y-direction electrodes 100y is formed. The insulation film 131 is formed over the whole area in which the mesh pattern 222' is formed, except for the parts of the through holes 132.

Figure 18:
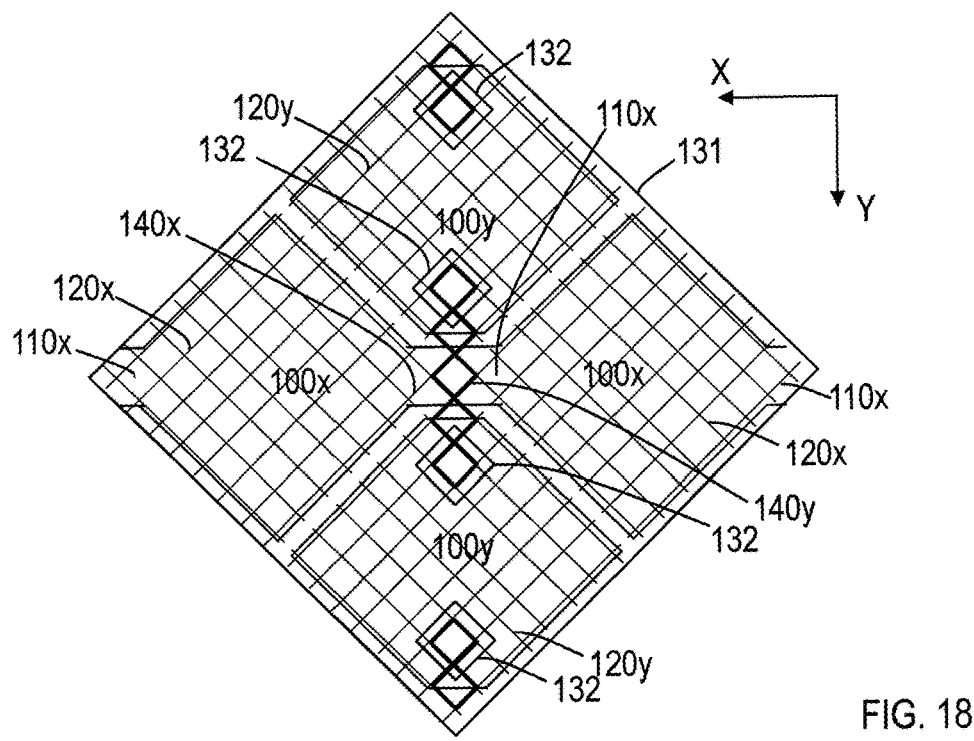
FIG. 18 is a view showing a state in which Y-direction connecting parts 140y are formed (printed) further in addition to the state in FIG. 17.

FIG. 18 shows a state in which the Y-direction connecting parts 140y are formed (printed) further in addition to the state in FIG. 17. The process of forming (printing) the Y-direction connecting parts 140y is the second mesh pattern process. In FIG. 18, the Y-direction connecting parts 140y are represented by a thick line so as to be seen clearly, but the actual Y-direction connecting parts 140y have the same width as the mesh pattern 222' and are placed on the mesh pattern 222', excluding the parts of breaks in the mesh pattern 222'. Both the Y-direction connecting parts 140y and the mesh pattern 222' form the mesh pattern 222 (see FIG. 4). Therefore, also in this embodiment, the Y-direction connecting parts 140y are formed as if they were formed like a mesh by the electrically conductive material so as to become parts of a predetermined mesh pattern. In the mesh pattern 222' shown in FIG. 15, parts on which the Y-direction connecting parts 140y are formed do not affect the conspicuousness and can be omitted.

Since the configuration is as described above, the touch panel 202 in the second embodiment can provide the same advantageous effect as the touch panel 200 in the first embodiment.

The description given above assumes that the transparent electrically conductive material process, the first mesh pattern process, the insulation film process, and the second mesh pattern process are performed in that order, but the order of the fabrication sequence can be reversed.

Modification

Described in this modification is a touch panel that can be fabricated through five processes, which are a transparent electrically conductive material process, a first mesh pattern process, an insulation film process, a second mesh pattern process, and a dummy electrode process. A plan view (view seen from the normal direction of the substrate 210) of a touch panel 203 in this modification is the same as that in FIG. 10. The touch panel 203 differs from the touch panel 202 in that: dummy electrodes 150 that are films of a transparent electrically conductive material are disposed further between X-direction electrodes 100x and Y-direction electrodes 100y, and dummy mesh electrodes 160 are also disposed in the areas in which the dummy electrodes 150 are formed. An enlarged plan view of a region including two X-direction electrodes 100x and two Y-direction electrodes 100y is the same as that shown in FIG. 11.

Figure 19:
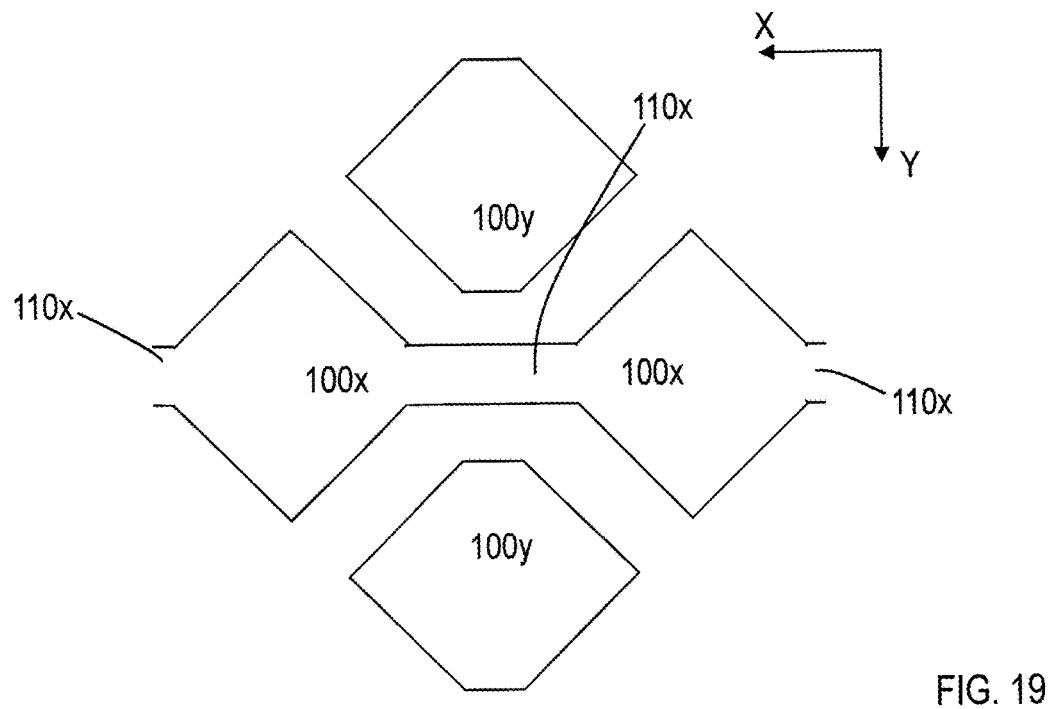
FIG. 19 is a view showing the X-direction electrodes 100x, the Y-direction electrodes 100y, and the X-direction connecting parts 110x in FIG. 11.
Figure 20:
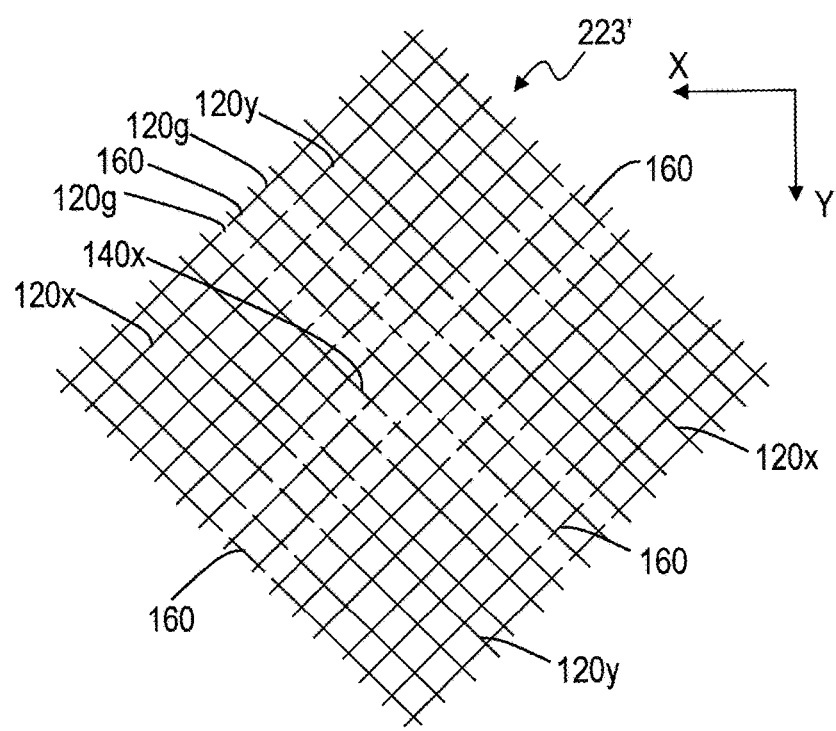
FIG. 20 is a view showing a mesh pattern 223' formed in the first mesh pattern process.

FIG. 19 is a view showing the X-direction electrodes 100x, the Y-direction electrodes 100y, and the X-direction connecting parts 110x in FIG. 11. In the transparent electrically conductive material process in this modification, films are formed as shown in FIG. 19, by using a transparent electrically conductive material. FIG. 20 shows a mesh pattern 223' formed in the first mesh pattern process. The mesh pattern 223' in FIG. 20 differs from the mesh pattern 221 in the modification of the first embodiment in that Y-direction connecting parts 140y are not present. In the example shown in FIG. 20, an X-direction connecting mesh electrode 140x connects adjacent X-direction mesh electrodes 120x with each other but does not need to be present in the position where a Y-direction connecting part 140y would be formed.

Figure 21:
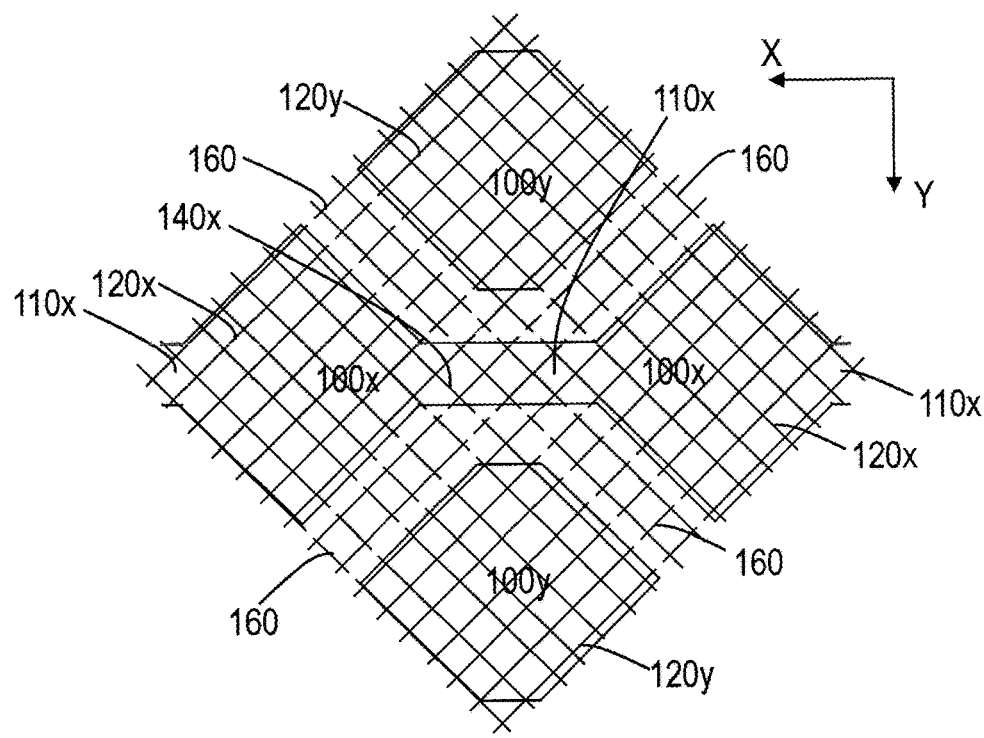
FIG. 21 is a view showing the mesh pattern 223' formed (printed) on the films of transparent electrically conductive material (the X-direction electrodes 100x, the Y-direction electrodes 100y, and the X-direction connecting parts 110x) shown in FIG. 19.

FIG. 21 is a view showing a state in which the mesh pattern 223' is formed (printed) on the films of the transparent electrically conductive material (the X-direction electrodes 100x, the Y-direction electrodes 100y, and the X-direction connecting parts 110x) shown in FIG. 19. The process of forming (printing) the mesh pattern 223' as shown here is the first mesh pattern process. Since dummy mesh electrodes 160 are also disposed in this modification, the positions of breaks 120g in the mesh pattern 223' differ from those in the mesh pattern 222. The dummy mesh electrodes 160 are formed like a mesh by an electrically conductive material, as a part of the mesh pattern 223', in the area where the dummy electrodes 150 are formed, and are insulated from X-direction mesh electrodes 120x and Y-direction mesh electrodes 120y.

The conditions for lowering the conspicuousness of the mesh pattern and the films of the transparent electrically conductive material are the same as those in the first embodiment. That is, the width of the electrically conductive material forming the mesh pattern 223 should be 7 μm or less; the repeating cycle of the mesh pattern 221 should be 200 to 400 μm; the length of each break for insulating the mesh pattern should be from 1 μm to 20 μm, both inclusive; and the spacing for insulating the films of the transparent electrically conductive material from each other should be from 1 μm to 50 μm, both inclusive. To enhance the reliability against corrosion, the width of the electrically conductive material should be 3 μm or larger.

Figure 22:
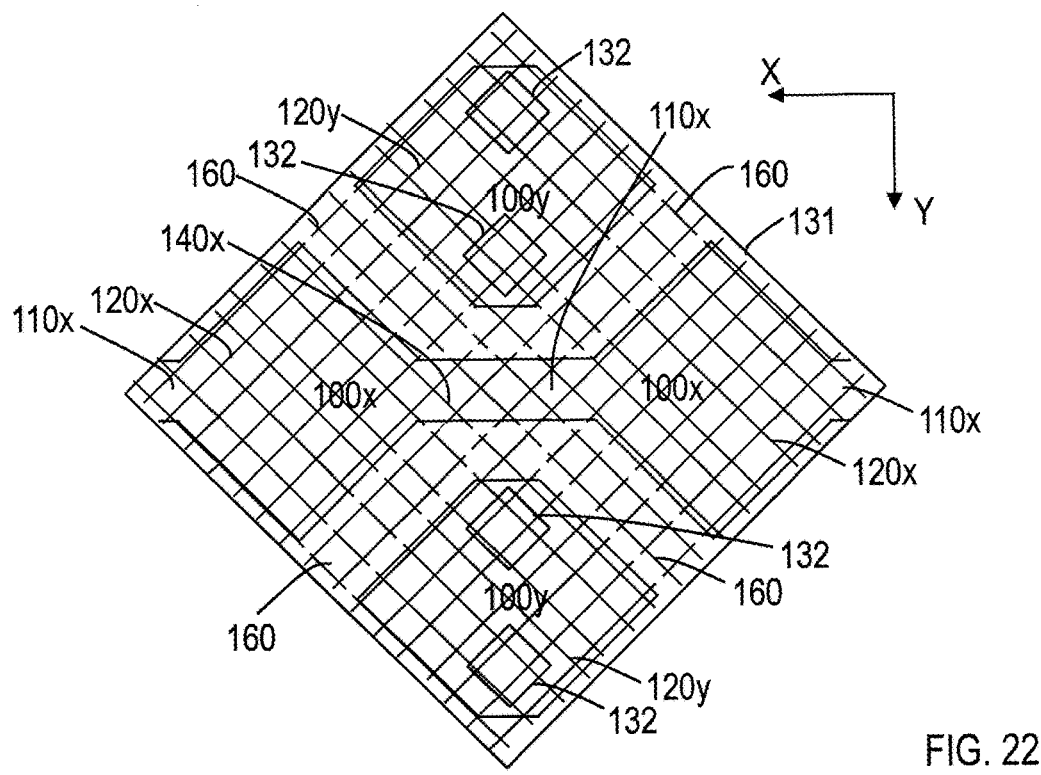
FIG. 22 is a plan view showing a state in which the insulation film 131 is formed in addition to the state in FIG. 21.

Next, an insulation film 131 is formed (insulation film process). FIG. 22 is a plan view showing a state in which the insulation film 131 is formed in addition to the state in FIG. 21. The insulation film 131 has through holes 132 in one or more parts of the area in which each of the Y-direction electrodes 100y is formed. The insulation film 131 is formed over the whole area in which the mesh pattern 223' is formed, except for the parts of the through holes 132.

Figure 23:
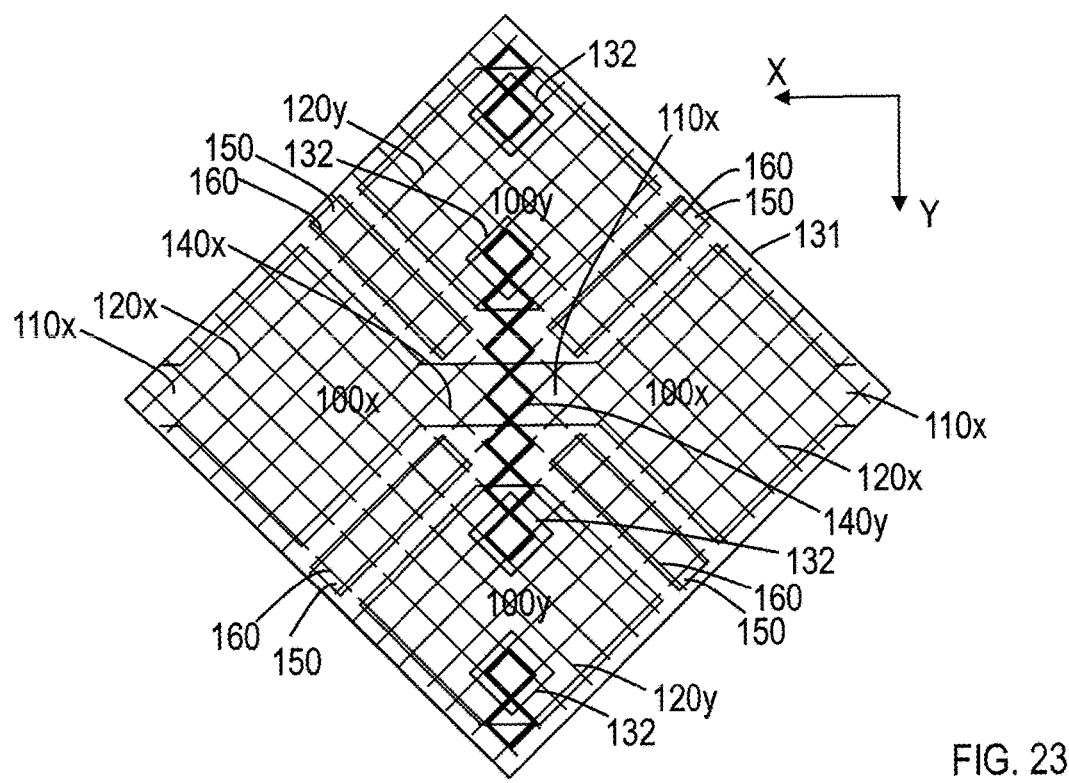
FIG. 23 is a view showing a state in which the Y-direction connecting parts 140y and the dummy electrodes 150 are formed (printed) further in addition to the state in FIG. 22.

Then, the second mesh pattern process and the dummy electrode process are executed. FIG. 23 shows a state in which the Y-direction connecting parts 140y and the dummy electrodes 150 are formed (printed) further in addition to the state in FIG. 22. In FIG. 23, the Y-direction connecting parts 140y are represented by a thick line in order so as to be seen clearly, but the actual Y-direction connecting parts 140y have the same width as the mesh pattern 223' and are placed above the mesh pattern 223', excluding the parts of breaks in the mesh pattern 223'. Both the Y-direction connecting parts 140y and the mesh pattern 223' form a mesh pattern 223 (see FIG. 10). Therefore, also in this modification, the Y-direction connecting parts 140y are formed as if they were formed like a mesh by the electrically conductive material so as to become parts of a predetermined mesh pattern. In the mesh pattern 223' shown in FIG. 20, parts above which the Y-direction connecting parts 140y are formed do not affect the conspicuousness and can be omitted. In the dummy electrode process, the dummy electrodes 150, which are films of the transparent electrically conductive material, are formed. In this modification, the dummy electrodes 150 and the dummy mesh electrodes 160 are formed on the opposite sides of the insulation film 131.

Since the configuration is as described above, the touch panel 203 can also provide the same advantageous effect as the touch panel 200 in the first embodiment.

The description given above assumes that the transparent electrically conductive material process, the first mesh pattern process, the insulation film process, the second mesh pattern process, and the dummy electrode process are performed in that order, but the order of the fabrication sequence can be reversed. In addition, either the second mesh pattern process or the dummy electrode process may be performed earlier.

DESCRIPTION OF REFERENCE NUMERALS

100x X-direction electrode
100y Y-direction electrode
110x X-direction connecting part
120g break
120x X-direction mesh electrode
120y Y-direction mesh electrode
130, 131 insulation films
132 through hole
140x X-direction connecting mesh electrode
140y Y-direction connecting part
150 dummy electrode
160 dummy mesh electrode
200, 201, 202, 203 touch panels
210 substrate
220, 221, 222, 223, 222', 223' mesh patterns

What is claimed is:
1. A touch panel comprising:
a transparent substrate;
a plurality of X-direction electrodes arranged along a plurality of lines in an X direction, which is a predetermined direction parallel to a surface of the substrate;
a plurality of Y-direction electrodes arranged along a plurality of lines in a Y direction, which is a direction parallel to the surface of the substrate and perpendicular to the X direction;
X-direction connecting parts that electrically connect X-direction electrodes adjoining in the X direction with each other;
Y-direction connecting parts that electrically connect Y-direction electrodes adjoining in the Y direction with each other; and
one or more insulation films that are formed between the X-direction connecting parts and the Y-direction connecting parts;

the X-direction electrodes, the Y-direction electrodes, and the X-direction connecting parts being films of a transparent electrically conductive material formed in the same layer;

the Y-direction connecting parts being formed like a mesh by an electrically conductive material so as to become a part of a predetermined mesh pattern;

in areas where the X-direction electrodes are formed, X-direction mesh electrodes being formed like a mesh by the electrically conductive material so as to become a part of the mesh pattern and being insulated from the Y-direction connecting parts;

in areas where the Y-direction electrodes are formed, Y-direction mesh electrodes being formed like a mesh by the electrically conductive material so as to become a part of the mesh pattern and being insulated from the X-direction mesh electrodes; and when there is a part where the one or more insulation films are not formed in the areas where the X-direction connecting parts are formed, X-direction connecting mesh electrodes being formed further like a mesh by the electrically conductive material so as to become a part of the mesh pattern and being insulated from the Y-direction connecting parts and the Y-direction mesh electrodes, at least in the part where the one or more insulation films are not formed in the areas where the X-direction connecting parts are formed.

2. The touch panel according to claim 1, wherein each of the Y-direction connecting parts electrically connects Y-direction electrodes adjoining in two or more paths formed by the electrically conductive material.

3. The touch panel according to claim 1, wherein the width of the electrically conductive material forming the mesh pattern is from 3 μm to 7 μm, both inclusive, the repeating cycle of the mesh pattern is 200 to 400 μm, the length of a break for insulating the mesh pattern is from 1 μm to 20 μm, both inclusive, and a spacing for insulating the films of the transparent electrically conductive material from each other is from 1 μm to 50 μm, both inclusive.

4. The touch panel according to claim 1, wherein the X-direction mesh electrodes, the Y-direction mesh electrodes, and the X-direction connecting mesh electrodes are not formed on the side of the one or more insulation films on which the Y-direction connecting parts are not formed.

5. The touch panel according to claim 4 further comprising:
dummy electrodes that are made of films of the transparent electrically conductive material and are formed between the X-direction electrodes and the Y-direction electrodes, in the same layer as the X-direction electrodes, the Y-direction electrodes, and the X-direction connecting parts; and
dummy mesh electrodes that are formed like a mesh by the electrically conductive material so as to become a part of the mesh pattern in the areas where the dummy electrodes are formed, and are insulated from the X-direction mesh electrodes and the Y-direction mesh electrodes.

6. The touch panel according to claim 1, wherein the one insulation film has through holes in one or more parts of the area where each of the Y-direction electrodes is formed, and is formed over the whole area where the mesh pattern is formed, except for the parts of the through holes.

7. The touch panel according to claim 6 further comprising:
dummy electrodes that are formed by the transparent electrically conductive material between the X-direction electrodes and the Y-direction electrodes; and
dummy mesh electrodes that are formed like a mesh by the electrically conductive material so as to become a part of the mesh pattern in the areas where the dummy electrodes are formed, and are insulated from the X-direction mesh electrodes and the Y-direction mesh electrodes.

8. The touch panel according to claim 7, wherein the dummy electrodes and the dummy mesh electrodes are formed on the opposite sides of the one or more insulation films.

9. The touch panel according to claim 2, wherein the width of the electrically conductive material forming the mesh pattern is from 3 μm to 7 μm, both inclusive, the repeating cycle of the mesh pattern is 200 to 400 μm, the length of a break for insulating the mesh pattern is from 1 μm to 20 μm, both inclusive, and a spacing for insulating the films of the transparent electrically conductive material from each other is from 1 μm to 50 μm, both inclusive.

10. The touch panel according to claim 2, wherein the X-direction mesh electrodes, the Y-direction mesh electrodes, and the X-direction connecting mesh electrodes are not formed on the side of the one or more insulation films on which the Y-direction connecting parts are not formed.

11. The touch panel according to claim 10 further comprising:
dummy electrodes that are made of films of the transparent electrically conductive material and are formed between the X-direction electrodes and the Y-direction electrodes, in the same layer as the X-direction electrodes, the Y-direction electrodes, and the X-direction connecting parts; and
dummy mesh electrodes that are formed like a mesh by the electrically conductive material so as to become a part of the mesh pattern in the areas where the dummy electrodes are formed, and are insulated from the X-direction mesh electrodes and the Y-direction mesh electrodes.

12. The touch panel according to claim 2, wherein the one insulation film has through holes in one or more parts of the area where each of the Y-direction electrodes is formed, and is formed over the whole area where the mesh pattern is formed, except for the parts of the through holes.

13. The touch panel according to claim 12 further comprising:
dummy electrodes that are formed by the transparent electrically conductive material between the X-direction electrodes and the Y-direction electrodes; and
dummy mesh electrodes that are formed like a mesh by the electrically conductive material so as to become a part of the mesh pattern in the areas where the dummy electrodes are formed, and are insulated from the X-direction mesh electrodes and the Y-direction mesh electrodes.

14. The touch panel according to claim 13, wherein the dummy electrodes and the dummy mesh electrodes are formed on the opposite sides of the one or more insulation films.

* * * * *